(No Model.)
J. H. MALAIER & E. J. SMITH.
FERTILIZER DISTRIBUTER.
No. 389,754. Patented Sept. 18, 1888.
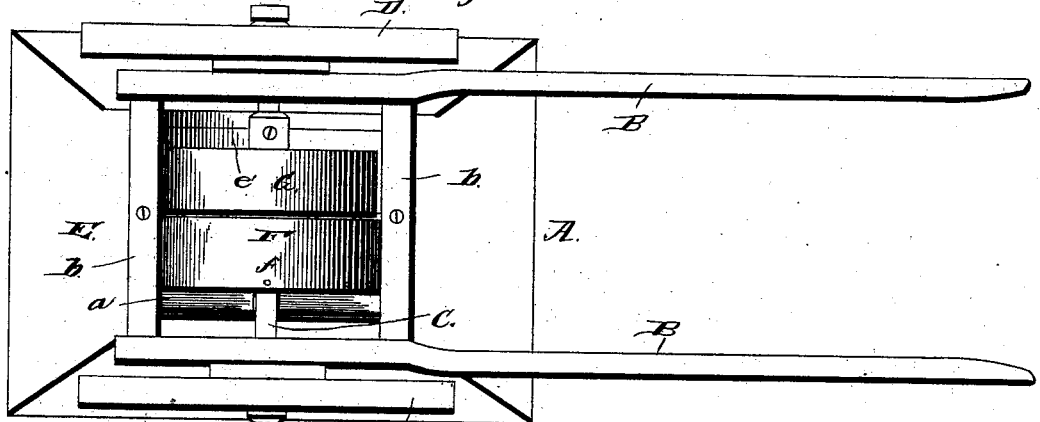
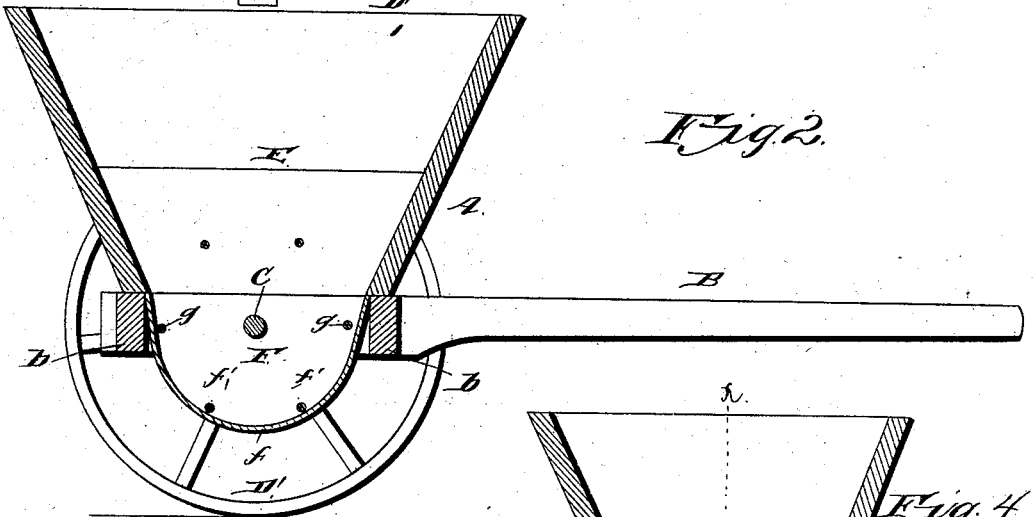
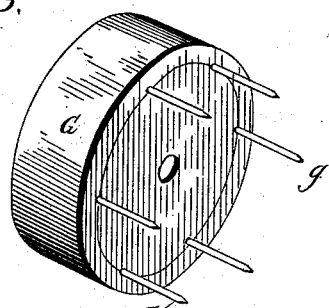
Witnesses
Geo. J. Thoepe
R. J. Marshall Jr.
Inventors
J. H. Malaier
E. J. Smith
By their Attorneys
C. A. Snow & Co.

UNITED STATES PATENT OFFICE.

JOSHUA HOPE MALAIER AND ELIJAH JOSHUA SMITH, OF SUNNY SIDE, GEORGIA.

FERTILIZER-DISTRIBUTER.

SPECIFICATION forming part of Letters Patent No. 389,754, dated September 18, 1888.

Application filed June 7, 1888. Serial No. 276,401. (No model.)

*To all whom it may concern:*

Be it known that we, JOSHUA HOPE MALAIER and ELIJAH JOSHUA SMITH, citizens of the United States, residing at Sunny Side, in the county of Spalding and State of Georgia, have invented a new and useful Improvement in Fertilizer-Distributers, of which the following is a specification.

The invention relates to improvements in fertilizer-distributers; and it consists in the construction and novel combination of parts hereinafter described, illustrated in the accompanying drawings, and pointed out in the appended claim.

Figure 1 represents a reversed plan of the machine. Fig. 2 represents a central vertical longitudinal section of the machine on line $x$ $x$ of Fig. 4. Fig. 3 represents a perspective view of the operative or discharge disk detached. Fig. 4 represents a transverse section of the distributer.

Referring to the drawings by letter, A designates the frame of the machine, composed of the shafts B B, the transverse bars $b$, connecting the rear portions of the shafts, and the longitudinal bar $a$ near one of said shafts, and having its ends secured to the bars $b$.

C is the axle, journaled in the shafts midway between the bars $b$, and D D' are the wheels, the former, which turns loosely upon the axle, being preferably the right wheel. The left wheel, D', is secured upon the axle, so as to turn therewith, by the set screw $d$, which passes through its hub and binds on the axle. By means of said screw the wheel D' may be set at different points on the axle, so that the latter may be practically lengthened and shortened, for a purpose hereinafter explained.

E is the hopper resting upon the transverse bars $b$, and having the lower portion of its side adjacent to the loose wheel D vertical, and composed of a block, $e$, that projects about half-way into the hopper, and has its lower edge, $e'$, semicircularly concave, the concavity extending from one bar $b$ to the other.

F is a semi-cylindrical fertilizer-receptacle, depending from the side of the hopper adjacent to the fixed wheel D', and composed of an outer semicircular side plate and a curved rim, $f$, preferably of metal, and extending to the block $e$.

$f'$ $f'$ are two metal fingers near the lower part of the receptacle and standing inward from the side plate thereof.

G is a disk secured upon the axle with its inner face adjacent to the edge of the rim $f$ of the fertilizer-receptacle, and provided close to its periphery with a circumferential series of inwardly-standing fingers, $g$, which, when the disk rotates with the shaft, pass below the fingers $f'$ and in contact with the rim $f$. As the machine moves forward, the said fingers $g$ distribute the fertilizer outward, evenly and regularly, between the disk and the rim of the receptacle, their coaction with the fixed fingers $f'$ serving to break the clods and reduce the material to uniform consistence.

On account of the regular circular motion of the fingers $g$, the fertilizer is continuously stirred and cannot clog. The feed-opening is between the disk and the rim of the receptacle, and it can be adjusted to the desired width by means of the wheel D' and set-screw $d$, whereby the disk can be moved outward away from the receptacle.

Having described our invention, we claim—

The combination of the shafts, the cross-bars $b$ $b$, secured to and between the same, the hopper mounted thereon, and having one side straight, and composed of an inwardly-projecting block, $e$, having a semicircular concave lower edge, the semicircular receptacle depending from the lower end of the hopper, and provided with inwardly-projecting fingers, the axle passing transversely across the lower end of the hopper and above said receptacle, and the disk mounted on the axle, moving under the block $e$ and adjacent to the receptacle, and provided with a series of inwardly-projecting fingers, substantially as specified.

In testimony that we claim the foregoing as our own we have hereto affixed our signatures in presence of two witnesses.

JOSHUA HOPE MALAIER.
ELIJAH JOSHUA × SMITH.
his
mark.

Witnesses:
I. C. LITTLE,
W. T. JORDAN.